United States Patent
Brändli et al.

(10) Patent No.: US 11,825,229 B2
(45) Date of Patent: Nov. 21, 2023

(54) EVENT-BASED VISION SENSOR USING ON/OFF EVENT AND GRAYSCALE DETECTION RAMPS

(71) Applicant: SONY ADVANCED VISUAL SENSING AG, Schlieren (CH)

(72) Inventors: Christian Brändli, Baden (CH); Raphael Berner, Confignon (CH)

(73) Assignee: SONY ADVANCED VISUAL SENSING AG, Schlieren (CH)

( * ) Notice: Subject to any disclaimer, the term of this patent is extended or adjusted under 35 U.S.C. 154(b) by 211 days.

(21) Appl. No.: 17/609,439

(22) PCT Filed: May 8, 2020

(86) PCT No.: PCT/IB2020/054398
§ 371 (c)(1),
(2) Date: Nov. 8, 2021

(87) PCT Pub. No.: WO2020/229980
PCT Pub. Date: Nov. 19, 2020

(65) Prior Publication Data
US 2022/0224856 A1   Jul. 14, 2022

Related U.S. Application Data

(60) Provisional application No. 62/846,283, filed on May 10, 2019.

(51) Int. Cl.
H04N 25/772   (2023.01)
H04N 25/40    (2023.01)
(Continued)

(52) U.S. Cl.
CPC .......... *H04N 25/772* (2023.01); *H04N 25/40* (2023.01); *H04N 25/75* (2023.01); *H04N 25/766* (2023.01)

(58) Field of Classification Search
None
See application file for complete search history.

(56) References Cited

U.S. PATENT DOCUMENTS 7,728,269 B2   6/2010 Lichtsteiner et al.
2008/0135731 A1   6/2008 Lichtsteiner et al.
(Continued)

FOREIGN PATENT DOCUMENTS

EP   3 032 822 A1   6/2016
WO   WO 2018/122800 A1   7/2018
WO   WO 2019/087471 A1   5/2019

OTHER PUBLICATIONS

Ruedi, P.-F., et al., A 128×128 Pixel 120-dB Dynamic-Range Vision-Sensor Chip for Image Contrast and Orientation Extraction, IEEE Journal of Solid-State Circuits, 38 (12): 2325-2333 (2003).
(Continued)

*Primary Examiner* — Mark T Monk
(74) *Attorney, Agent, or Firm* — HoustonHogle LLP

(57) ABSTRACT

A dynamic vision sensor such as an event based vision sensor employs analog to digital converters (ADC), such as ramp ADCs, that analog to digital converts the signals from photoreceptors. Only previous light values need to be stored in the pixels. This is accomplished by generating three ramps. In addition, log compression can be implemented by increasing the count linearly while increasing the reference voltage exponentially, or increasing the count logarithmically while increasing the reference voltage linearly.

16 Claims, 13 Drawing Sheets

(51) Int. Cl.
H04N 25/75 (2023.01)
H04N 25/766 (2023.01)

(56) References Cited

U.S. PATENT DOCUMENTS

| | | |
|---|---|---|
| 2010/0073294 A1* | 3/2010 | Kim .................. H04N 23/72 348/294 |
| 2013/0215286 A1 | 8/2013 | Ohya et al. |
| 2018/0191972 A1 | 7/2018 | Berner et al. |

OTHER PUBLICATIONS

International Search Report and Written Opinion of the International Searching Authority, dated Jul. 20, 2020, from International Application No. PCT/IB2020/054398, filed on May 8, 2020, 15 pages.

International Preliminary Report on Patentability, dated Nov. 25, 2021, from International Application No. PCT/IB2020/054398, filed on May 8, 2020. 10 pages.

* cited by examiner

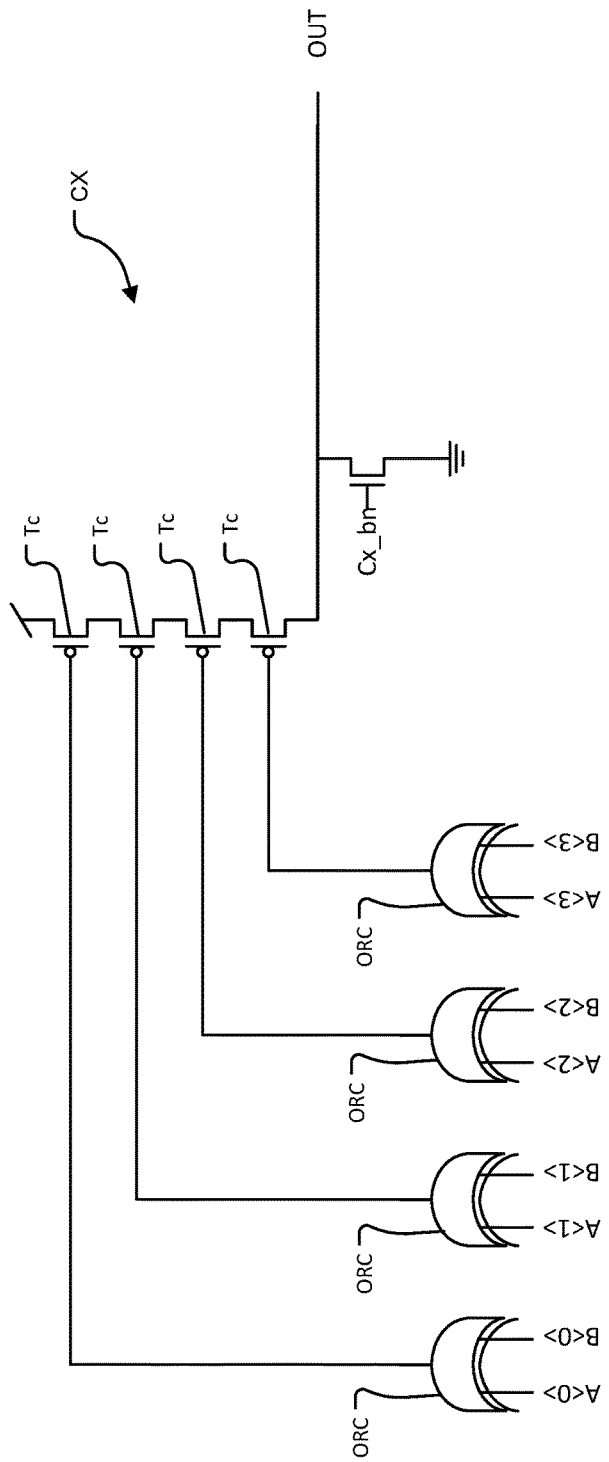
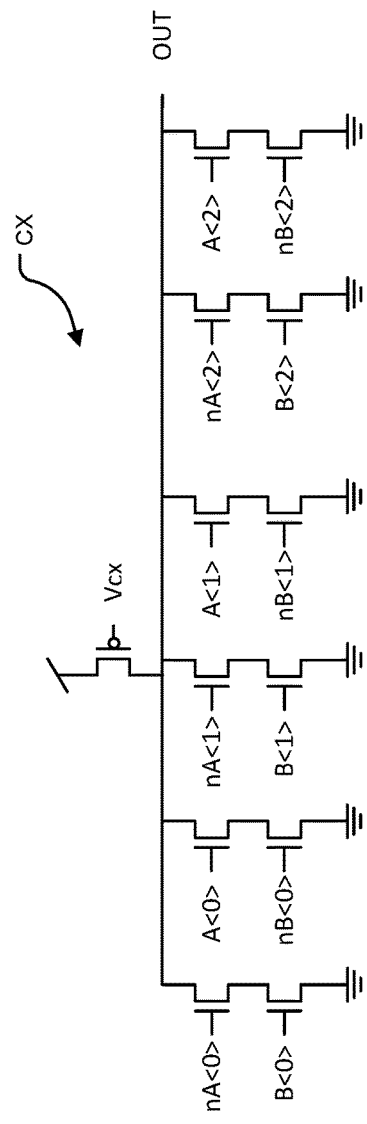
Fig. 9A
Fig. 9B

EVENT-BASED VISION SENSOR USING ON/OFF EVENT AND GRAYSCALE DETECTION RAMPS

RELATED APPLICATIONS

This application is a § 371 National Phase Application of International Application No. PCT/IB2020/054398, filed on May 8, 2020, now International Publication No. WO 2020/229980 A1, published on Nov. 19, 2020, which International Application claims the benefit under 35 USC 119(e) of U.S. Provisional Application No. 62/846,283, filed on May 10, 2019, both of which are incorporated herein by reference in their entirety.

BACKGROUND OF THE INVENTION

Today, machine vision is mostly based on conventional cameras and their associated frame-based, spatially resolved optical sensors. For some machine vision tasks, e.g., object recognition, these conventional frame-based cameras, with their image-based optical sensors, are well suited. However, for other tasks, e.g., monitoring, tracking or position and motion estimation, the conventional image sensors have drawbacks.

The main drawback is that conventional cameras produce a significant amount of redundant and unnecessary data, which has to be captured, communicated and processed. This high data load slows down the reaction time by decreasing temporal resolution, results in increased power consumption, and increases the size and cost of machine vision systems. In addition, most image sensors suffer from limited dynamic range, poor low-light performance and motion blur.

On the other hand, so-called Dynamic Vision Sensors (DVS) overcomes the limitations of frame-based encoding. See U.S. Patent Application Publication No. US 2008/0135731, by Lichtsteiner et al., entitled "Photoarray for Detecting Time-Dependent Image Data", which is incorporated herein by this reference. These spatially-resolved optical sensors are used in-pixel data compression to remove data redundancy. They can also achieve high temporal resolution, low latency, low power consumption, high dynamic range with little motion blur. The DVS-type of optical sensor is thus well suited, especially for solar or battery powered compressive sensing or for mobile machine vision applications where the position of the system has to be estimated and where processing power is limited due to limited battery capacity.

The DVS pre-processes visual information locally. Instead of generating crisp images, the DVS produces smart data for computer applications. While conventional image sensors capture a movie as a series of still images, the DVS detects and only transmits the position of changes in a scene. It encodes the visual information much more efficiently than conventional cameras because it does so in-pixel data compression. This means that processing of data is possible using fewer resources, lower net power and with faster system reaction time. The high temporal resolution allows continuously tracking visual features and thereby overcoming the correspondence problem. Additionally, the architecture of DVS allows for high dynamic range and good low-light performance.

Event-based vision sensors (EVBS) are often but not always variants of the original DVS architectures. The pixels of many EVBS's operate asynchronously at least in portions of their pixels without a periodic sampling rate and emit a so-called DVS address event as soon as they perceive a luminance change exceeding an adjustable threshold. ON events are associated with an increase in luminance exceeding the threshold; and OFF events are associated with a decrease in luminance exceeding the threshold at a given pixel.

In addition, there are many examples of hybrid spatially-resolved optical sensors. For example, it has been proposed to combine frame-based image sensing with event-based vision sensing into the same array of pixels. Moreover, there are other proposed sensor architectures that provide different combinations of event detection and image sensing.

SUMMARY OF THE INVENTION

Typically, vision sensors capture temporal change events through a combination of several elements, all of which can have certain shortcomings in many of the proposed architectures.

Current-domain logarithmic (log) photoreceptors are continuous time circuits. They typically have an additional shot noise source from a feedback transistor in each pixel. They also suffer from a reduced signal to noise ratio (SNR) in low-light conditions compared to conventional image sensors. They also tend to be slow in low light conditions.

The analog memories of these sensors also present design challenges. They suffer from leakage and can consume a relatively large surface area on the sensor die. Moreover, the nature of the memories means that the integrated signal is lost during pixel reset. The magnitude of the event is lost, i.e. amount of change that triggered the event, is unknown.

The in-pixel comparators of the sensors pose problems. They are complex and require many transistors. This impacts the sensors' fill factors.

The present invention can be employed to address some or all of these previously identified issues. It can further facilitate higher pixel densities than some previous designs. Moreover, it can further yield a pixel that allows immediate knowledge of the event magnitude, i.e. the amount of change encoded by one event.

At the same time, stacked CMOS image sensor (CIS) processes allow small feature sizes on the bottom wafer while having a highly light sensitive upper wafer. This cannot really be leveraged by DVS-type architectures, however. The capacitance of metal-insulator-metal (MiM) capacitors common to CMOS processes does not scale with feature size. They thus tend to dominate die area as other circuits shrink. Also, many transistors cannot be scaled to the CMOS process's minimal feature size since matching is important. Moreover, many transistors have to be designed to operate with high supply voltages and thus thick gate oxide layers to have sufficient swing or sufficiently small gate/channel leakage. Also, new CIS processes use highly optimized photoreceptors with full charge transfer to reduce noise, but DVS architectures cannot take advantage of these process advancements because the photodiode is operated in continuous-time.

Some embodiments of the present invention exploit these stacked CIS processes. An optical sensor with a photoreceptor wafer can "write" its value into a lower digital wafer, in which memory and/or processing is possibly performed. Avoiding the use of some or all of the analog memories avoids leakage and in a stacked CIS process, it potentially allows the pixel to be shrunk.

Two challenges when transitioning to a digital memory are an efficient analog-to-digital conversion scheme and an efficient way to compare the current value with the past. The proposed invention can be employed to solve these challenges by using an analog and a digital comparator (CX) in combination with two sets of ramps (analog and digital). This allows it to establish an analog to digital (A-D) conversion in time. Multiple analog ramps for each cycle are used to discriminate ON and OFF events. Another analog ramp is used to resolve the pixel's illumination or grayscale value.

The present approach can achieve this functionality with only a single digital memory per pixel. This feature can be exploited to reduce power and increase density.

In general, according to one aspect, the invention features an optical sensor, wherein each pixel comprises a photoreceptor for detecting received light, an analog comparator for comparing signals from the photoreceptor to voltage ramps, a memory for storing a previous illumination value, a digital comparator for comparing a current count to the previous illumination value, and control logic for determining whether an event has occurred based on the digital comparator and the analog comparator.

Usually, the control logic determines whether an ON event or OFF event occurred.

In addition, stacked CIS processes can be employed. For example, the photoreceptor and at least part of the analog comparator are implemented in a different wafer/die from the memory and the digital comparator.

In embodiments, the analog comparator compares the signal from the photoreceptor to a registration ramp and the control logic stores the count as a new illumination value in the digital memory based on the comparison by the analog comparator.

Preferably three different ramps are used. Specifically, a controller and counter generates an ON event ramp for determining ON events, an OFF event ramp for determining OFF events, and a registration ramp for determining a current illumination of the photoreceptor.

In general, according to another aspect, the invention features an optical sensing method, comprising generating a digital comparison of a count and a previous illumination value, generating an analog comparison between a signal from a photoreceptor and voltage ramps, and determining whether an event has occurred based on the digital comparison and the analog comparison.

In addition, the photoreceptors and at least part of the analog comparators can be implemented in a different wafer from the current memory and the old memory. This way, one wafer can be optimized for light detection while the other wafer can be optimized for digital circuitry.

Often, the ramp voltage varies exponentially over time.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 9A and 9B are circuit diagrams showing two implementations of the digital comparator;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
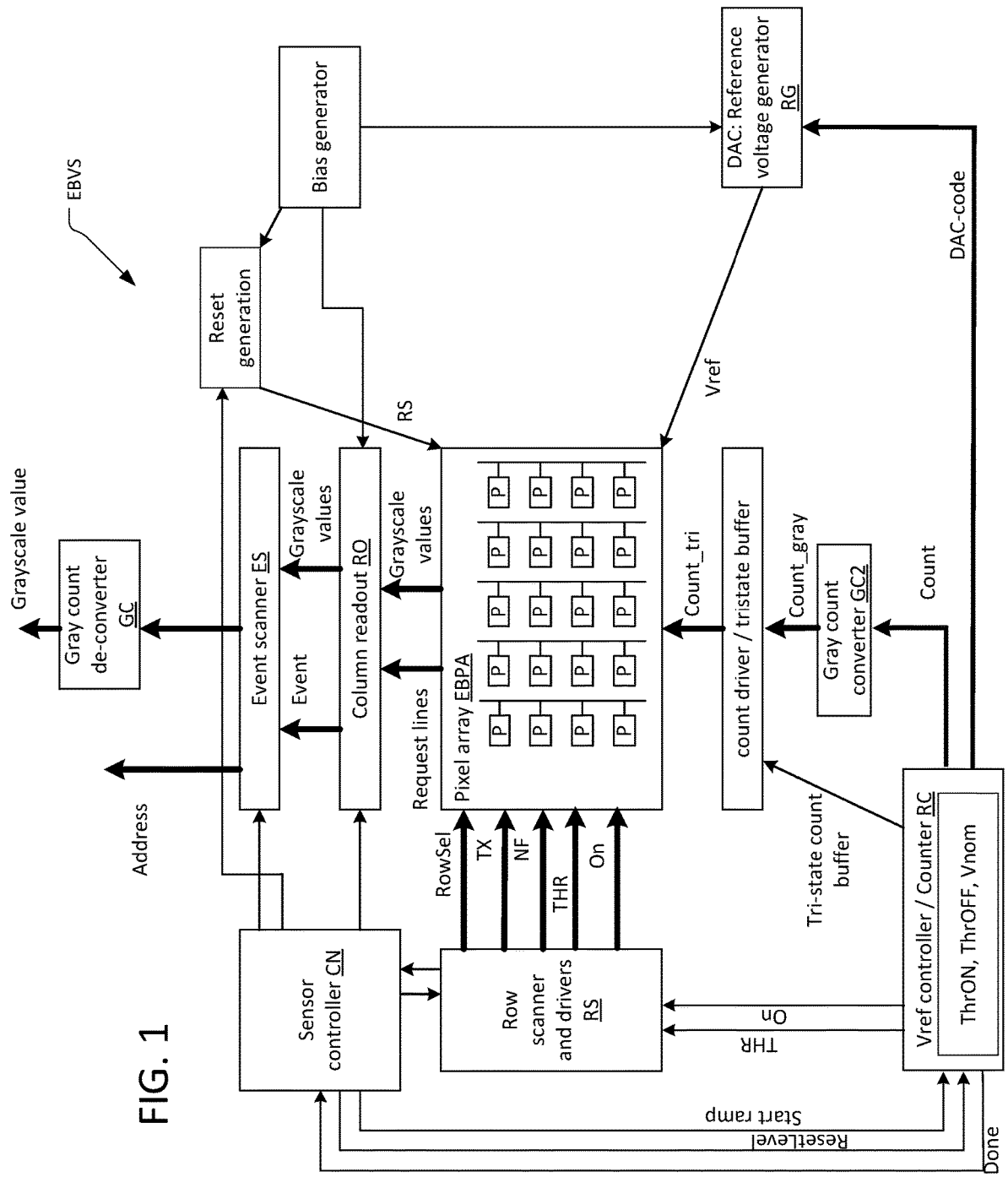
FIG. 1 is a schematic block diagram showing a dynamic vision sensor such as an event-based vision sensor EBVS with its event-based pixel array EBPA employing multiple, such as three, voltage ramps for ON event, OFF event, and grayscale detection according to the present invention.

FIG. 1 shows the lay-out of a dynamic vision sensor such as an event-based vision sensor EBVS employing three voltage ramps for ON event, OFF event, and grayscale detection according to the present invention.

It has an event-based pixel array EBPA and column read-out circuitry RO that reads the events generated by the array EBPA along with grayscale values for each pixel.

The EBPA is usually a two-dimensional, spatially-resolved array of pixels P. Often the array has more than 100 columns and more than 100 rows. In one example, this readout is row-wise as controlled by a row drivers circuit RS. A sensor controller CN coordinates the operation of the sensor EBVS and typically controls an event scanner ES to provide an event data stream in the form of pixel addresses along with gray scale values, potentially via a gray count deconverter GC, to another processing unit (e.g. central processing unit (CPU), microcontroller, digital signal processor (DSP)). Often the event data stream is in the form of the addresses of the pixels P that detected a light change. Each of these addresses encodes the position of a pixel in the array, in the form of two numbers representing x-y coordinates. Often, another bit is included to differentiate between ON and OFF events. The grayscale values are typically digital words representing the light received by each pixel and are typically accumulated into a frame of image data.

The sensor controller CN also controls a Vref controller/counter RC that also provides a counter output and a DAC-code to a reference voltage generator RG that generates the reference voltage Vref to the array EBPA. The counter output and the reference voltage Vref are produced by the ramp and counter circuit RC and are synchronized in time with each other. This means that there is an established relationship between the instantaneous counter output and the instantaneous voltage of the reference voltage. Often the reference voltage Vref takes the form of an increasing voltage (linear or exponential) ramp over time, that ascends and/or descends in voltage, with the count of the counter tracking and digitally representing Vref. According to the embodiments, this analog ramp is shifted by the thresholds associated with ON events ThrON and OFF events ThrOFF stored in the Vref controller/counter RC. (See, e.g., FIG. 5) Also stored in voltage versus time profile is the nominal Vref ramp, Vnom. Often this is simply a lookup table.

It may be preferential if the count that is distributed to the pixel is a gray count because this makes the overall circuit more robust against glitches. In this case, a gray count converter GC2 and a gray count de-converter GC are needed. The gray count converter GC2 converts a normal binary number into a corresponding gray count. Gray counts have the property that from one state to the next, only one bit changes. The gray count de-converter converts the gray count back to a normal binary number.

Figure 2:
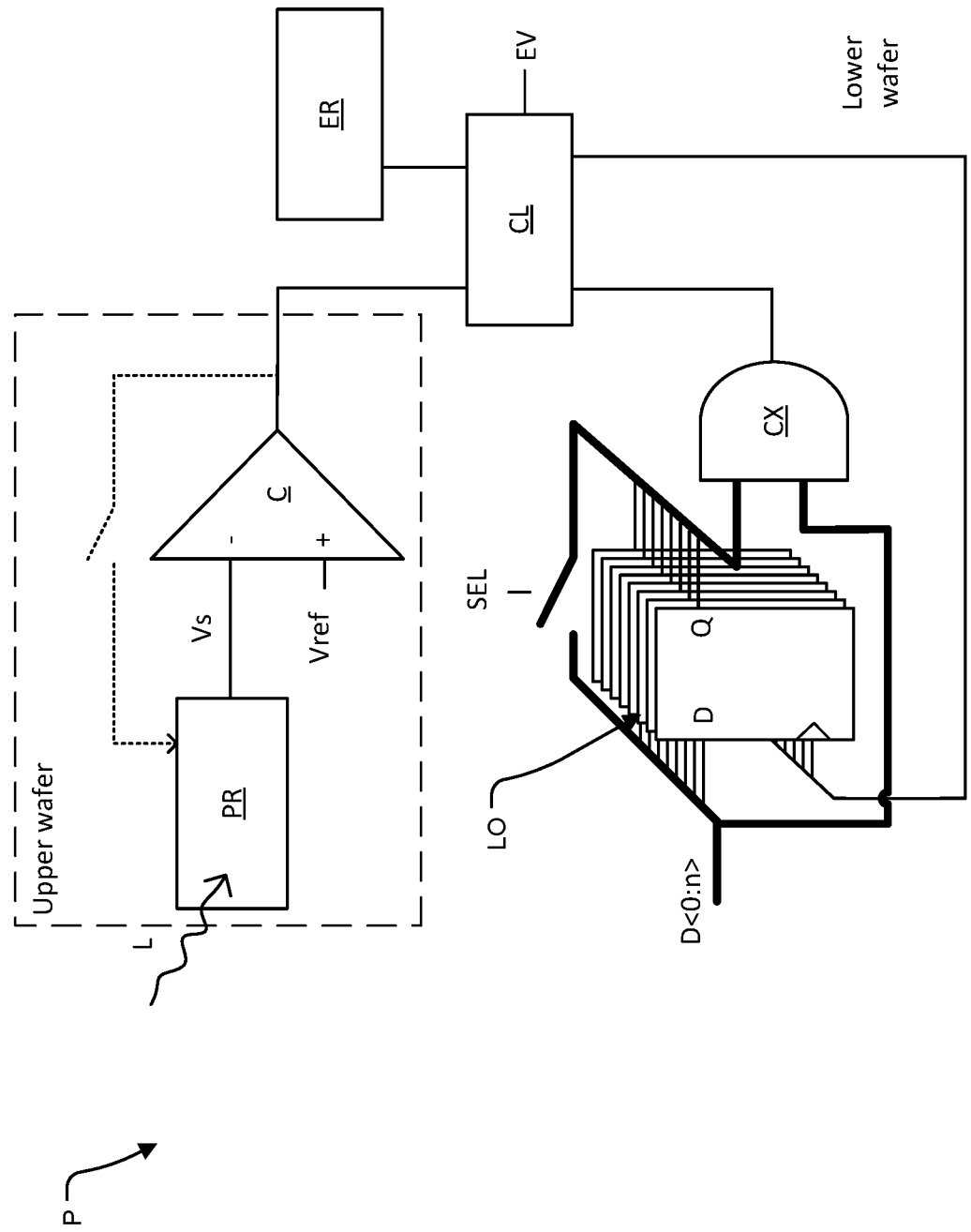
FIG. 2 is a schematic diagram of a digital pixel for an event-based pixel array employing a triple ramp event/grayscale detection.

FIG. 2 shows the general configuration of each of the pixels P along with other circuitry that may or may not be resident in different wafers and thus chip dies of the singulated sensors.

In more detail, an old illumination latch array LO stores the previous illumination value received by the pixel as a multi bit digital word. Its length is often equal to or more than 4 bits and is usually 8 bits (D<0:n=7>) or more.

For each of a threshold ON event detection phase (Thr ON detection) and threshold OFF event detection phase (Thr OFF detection), a count is generated by the Vref controller/counter RC and received through the count driver/tristate buffer TRI. This count is compared to the previous illumination value, held in the old illumination latch array LO, by a digital comparator CX. At the moment the count reaches the stored previous illumination value, the digital comparator signals control logic CL.

At the same time, a photoreceptor PR is resident in each of the pixels. It converts the incoming light L into a photoreceptor voltage Vs with either with linear or logarithmic charge to voltage mapping. A comparator C of the pixel P compares the photoreceptor voltage Vs with the reference voltage Vref. This comparator may include some form of hysteresis to avoid problems due to bouncing comparator output.

Figure 5:
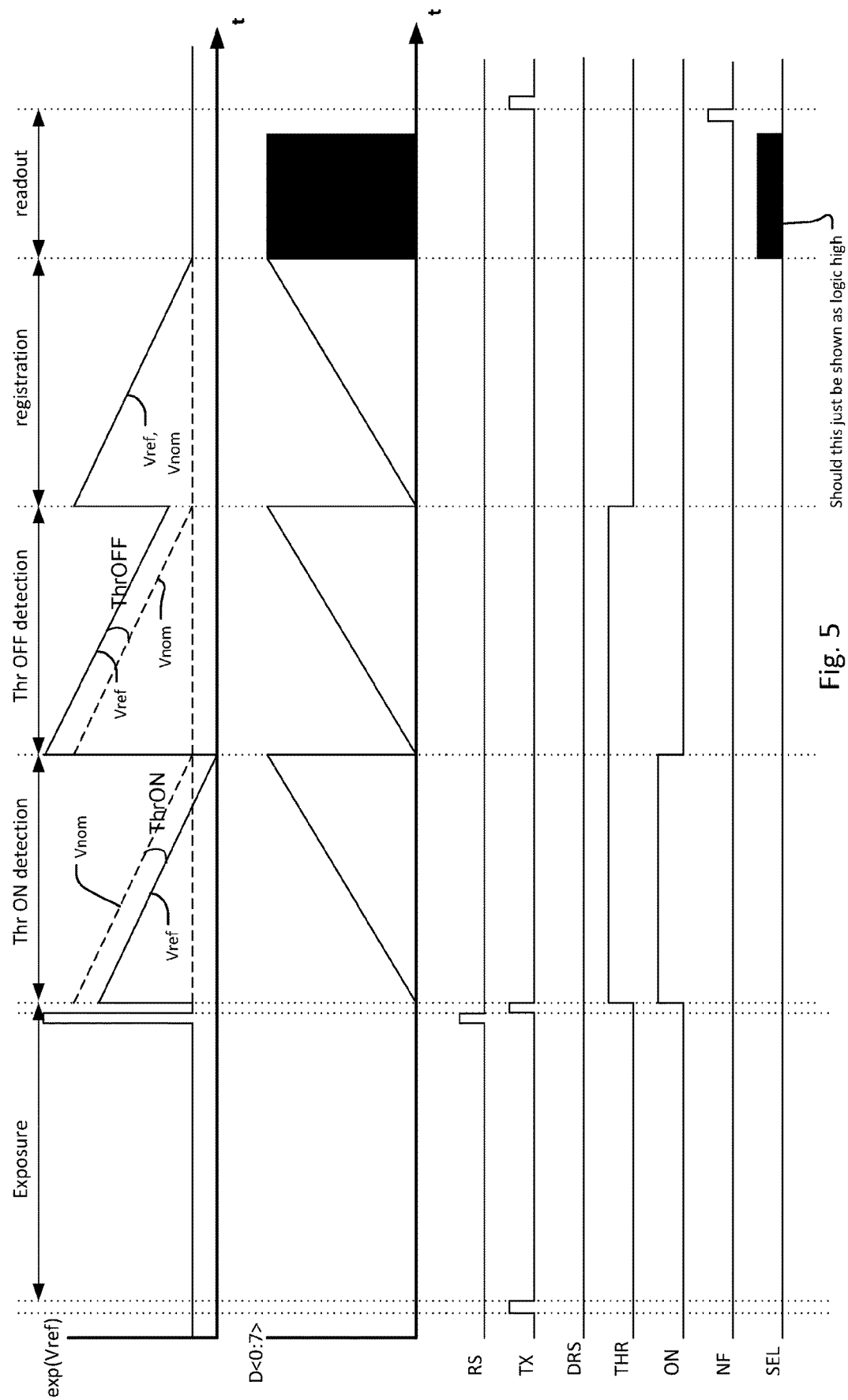
FIG. 5 is a timing diagram for a sensor employing the first embodiment pixel.

To detect whether an event was triggered i.e. the change crossed a certain upper (ON) or lower (OFF) threshold (ThrON, ThrOFF), the last value is stored in the memory of the old illumination latch array. Vref is a voltage ramp with a threshold offset with respect to a nominal ramp Vnom. During the threshold ON event detection phase, the Vref ramp has an ON threshold offset (ThrON) and during the threshold OFF event detection phase, the Vref ramp has an OFF threshold offset (ThrOFF) as shown in FIG. 5.

If the current value at the point when the count reaches the memory value stored in the old illumination latch array LO, is above this Vref with the threshold offsets, the corresponding ON or OFF event is triggered and stored for readout in the event register ER by the control logic CL for either of the threshold ON event detection phase or the threshold OFF event detection phase.

Then, to update the old illumination latch array LO with a new illumination value, a ramp without an offset (Vref=Vnom) is applied and once it reaches the current value, this new count value is stored in the memory or illumination latch array LO (registration) and is also preferably read out as a grayscale value.

In addition, some embodiments will exploit stacked CIS processes. The photoreceptor PR, in an upper wafer, will "write" its value into a lower digital wafer, in which memory (old illumination latch array LO) and/or processing (digital comparator CX, control logic CL, event register ER) is performed. Avoiding the use of some or all of the analog memories avoids leakage and in a stacked CIS process; it potentially allows the pixel to be shrunk.

In other examples, any portions of analog circuits including PMOS transistors are also implemented in the lower wafer. Thus, only NMOS transistors are in upper wafers. In common implementations of the comparator C, two or three PMOS transistors are needed. These can be implemented on lower wafers. This needs two or three wafer-to-wafer connections per pixel depending on the implementation of the amplifier.

Figure 3:
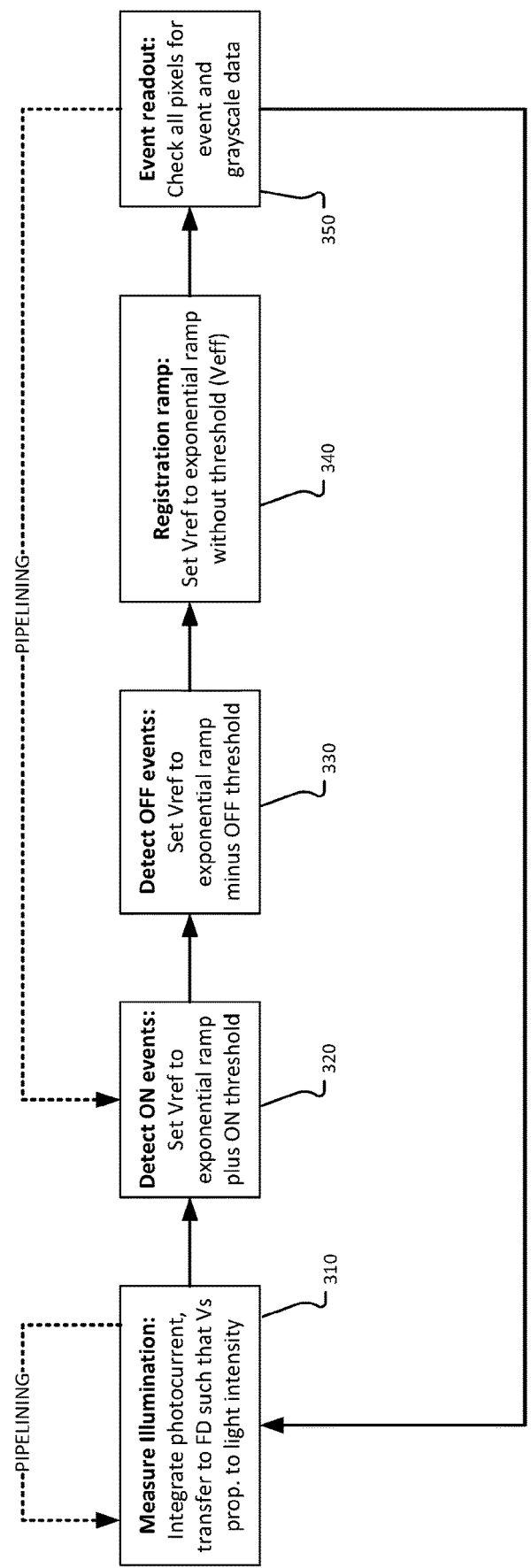
FIG. 3 is a flow diagram showing a triple ramp event/grayscale detection method.

FIG. 3 shows the different phases of the pixels of the sensor.

In step 310 the photoreceptor PR integrates the photocurrent such that the sensor voltage Vs is proportional to the intensity of the received light L, in an exposure phase.

During the threshold ON event detection phase 320, Vref is set to preferably an exponential ramp plus the ON threshold ThrON. If present, the control logic CL stores an event in the event register ER.

During the threshold OFF event detection phase 330, Vref is set to preferably an exponential ramp plus the OFF threshold ThrOFF. If present, the control logic CL stores an event in the event register ER.

The thresholds ThrON and ThrOff may be constant during the ramps, or they may vary for different portions of the ramp. If the ramp voltage increases exponentially, it may be beneficial if the thresholds increase exponentially as well.

Then, during a registration phase of step 340, Vref ramp without offset (Vref=Vnom) is generated. The comparator C triggers when the reference voltage Vref exceeds the sensor voltage V, and during this phase, if an event is stored in the event register ER, the control logic CL then clocks the old illumination latch array LO to store the current count as the new illumination value to be held in the latch array. The control logic also provides this new illumination value as the pixel's grayscale value.

Then during an event readout, the content of the event register ER and illumination latch array LO are provided to indicate an event and the pixel's grayscale value.

Figure 4:
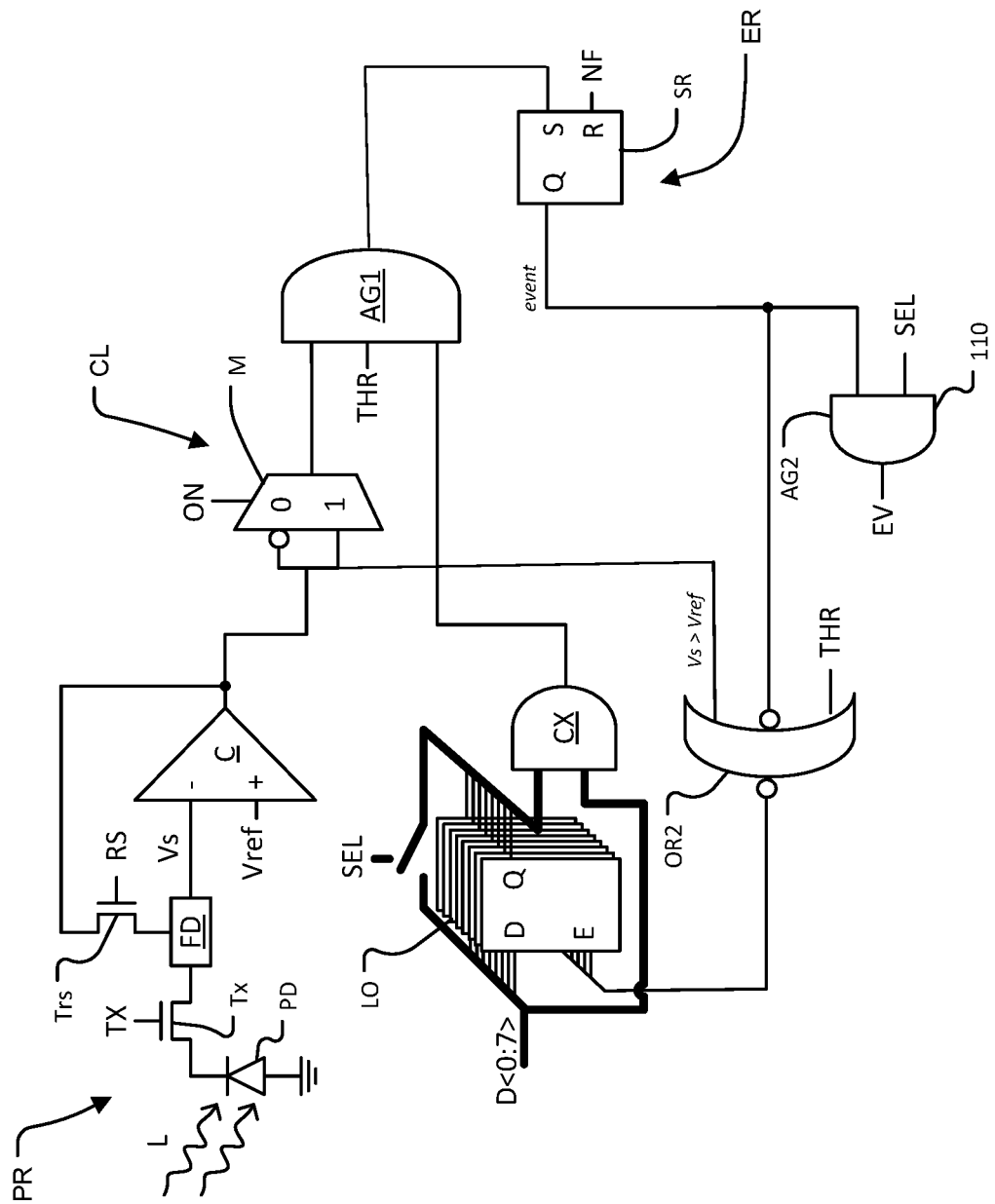
FIG. 4 is a circuit diagram of a digital pixel for an event-based pixel array according to a first embodiment.

FIG. 4 is a circuit diagram of the pixels P according to a more specific embodiment that uses a level sensitive memory.

Here, a conventional active pixel circuit (APS) front-end is employed. It includes a pinned photodiode PD and charge transfer transistor Tx controlled by a charge transfer signal TX, a floating diffusion FD and a reset transistor Trs controlled by a reset signal RS.

The pixel P uses the same comparator C for readout/comparison by providing a feedback path from the output of the comparator C to its inverting input (−). Thus, a double sampling is inherently used to reduce pixel-to-pixel differences due to comparator offsets.

The control logic CL includes a multiplexor M that is controlled by a binary signal ON, which is logic high during the threshold ON event detection phase. The multiplexor passes the output of the comparator C or its inverse.

A first AND gate AG1 of the control logic CL receives the output of the multiplexor M, a signal THR that is logic high during both the threshold ON event detection phase and threshold OFF event detection phase along with the output of the digital comparator CX.

The output of the first AND gate AG1 is received at the set input of a set-reset latch SR. This latch is reset at the end of the registration phase by signal NF.

The event output is provided through a second AND gate AG2 when signal SEL is high during the readout phase. Signal SEL is logic high for each row separately for a short time. There are separate instances: sel 0, sel 1, . . . , sel n, for each row of the pixel array.

A second OR gate OR2 receives the inverted output of the set-reset latch SR, the output of the comparator C and the THR signal. Its inverted output drives the enable inputs of the D latches of the old illumination latch array LO.

In this way, the state of the analog comparator C is checked at the moment that the digital comparator CX indicates that count equals the value stored in the illumination latch array LO. Thus, an event is declared if Vs exceeds Vref, which is offset by the event thresholds ThrON, ThrOFF.

FIG. 5 is a timing diagram showing the signals for the pixel circuit of FIG. 4.

Figure 6:
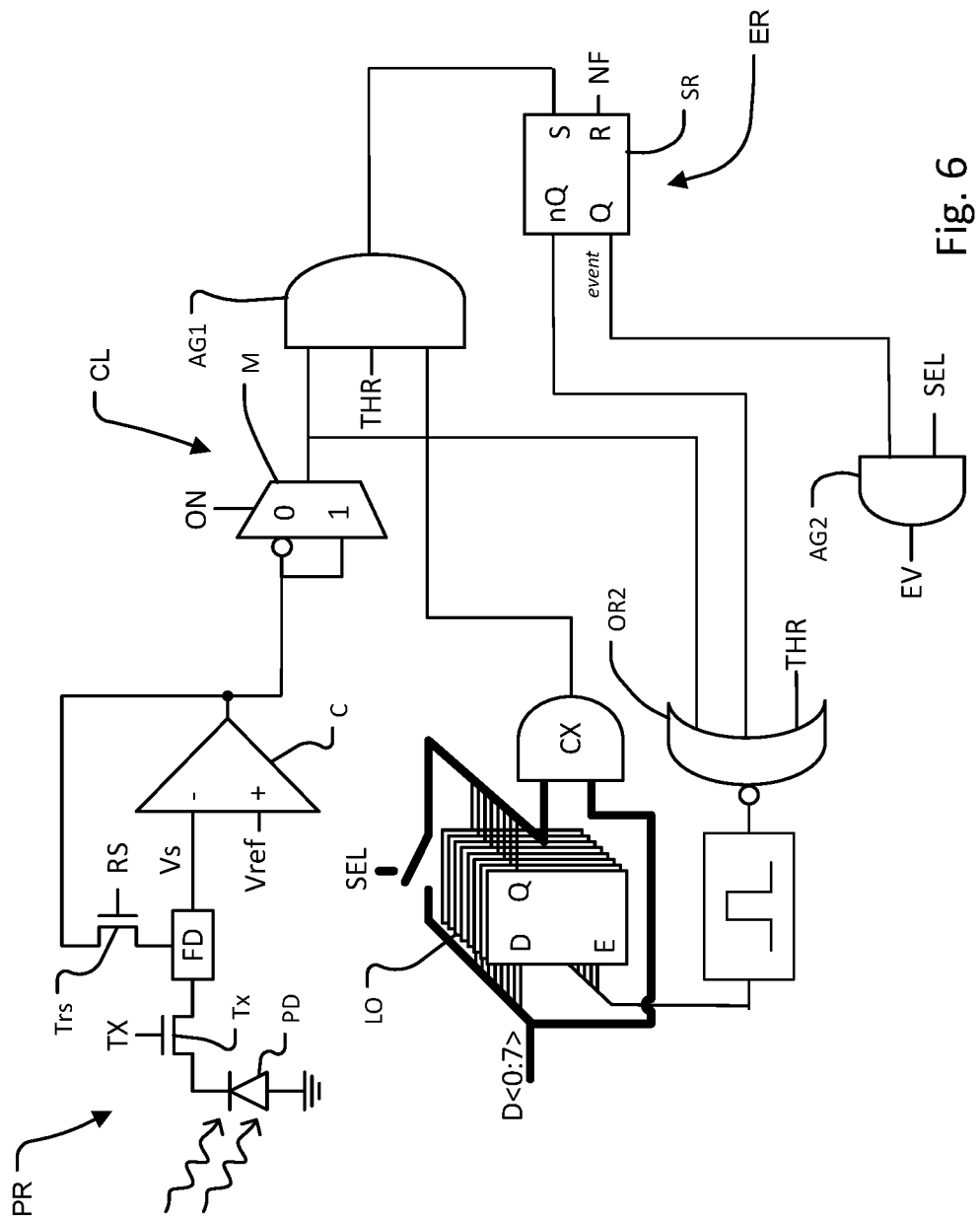
FIG. 6 is a circuit diagram of a digital pixel for an event-based pixel array according to a second embodiment.

FIG. 6 is a circuit diagram of the pixels P according to a second embodiment that also uses a level sensitive memory.

Here, the output of the multiplexor M is provided to the second OR gate OR2, which also receives a not-output of the set-reset latch SR. A pulse-generator is added between OR2 and the enable input E of the memory.

Figure 7:
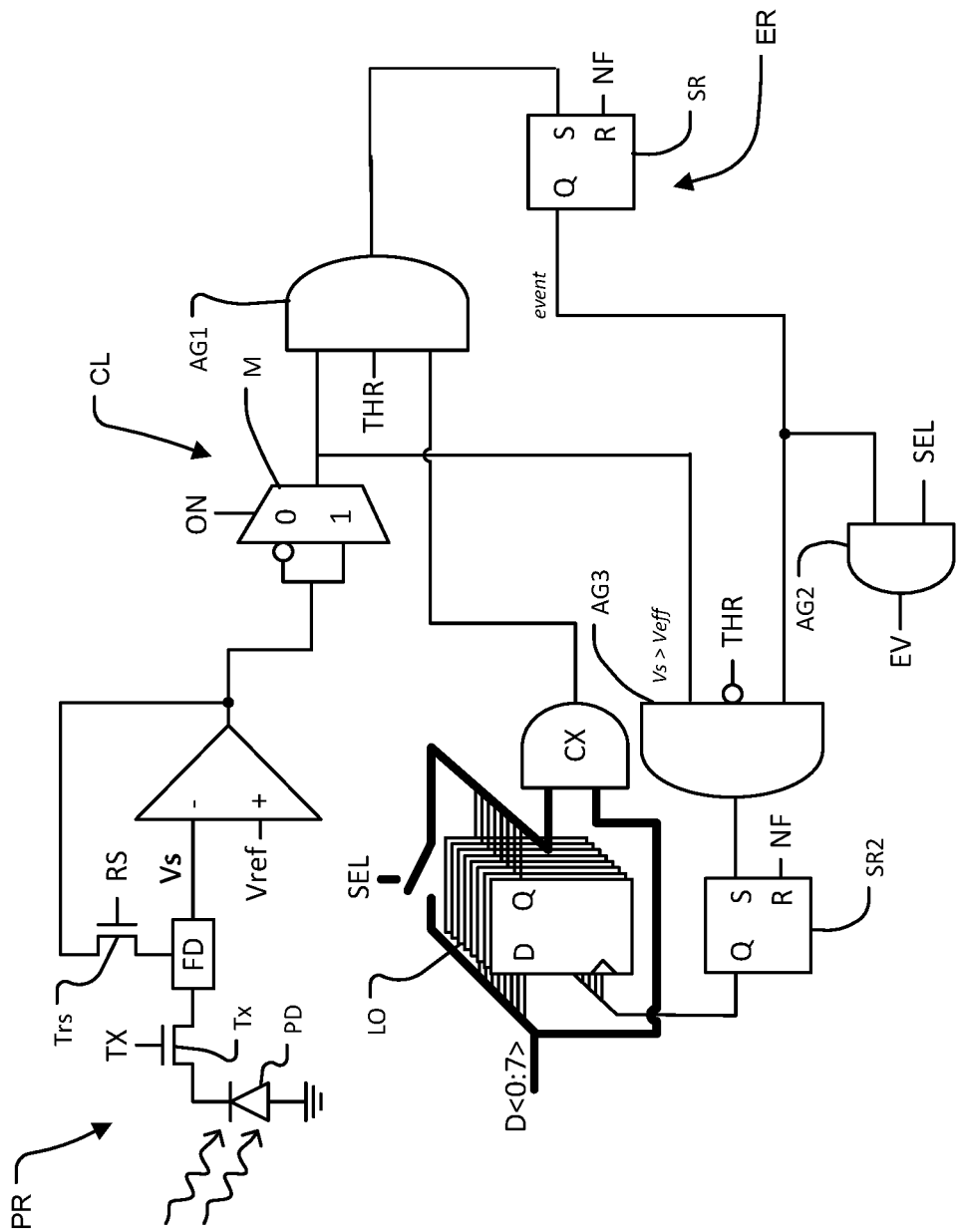
FIG. 7 is a circuit diagram of a digital pixel for an event-based pixel array according to a third embodiment.

FIG. 7 is a circuit diagram of the pixels P according to a third embodiment that uses an edge sensitive memory.

It includes a second set-reset latch SR2 at the output of the second OR gate OR2. This second set-reset latch SR2 is reset by signal NF that signals the end of the readout phase.

Here, the output of the multiplexor M is provided to a third AND gate AG3, which also receives a not-output of the set-reset latch SR.

Figure 8:
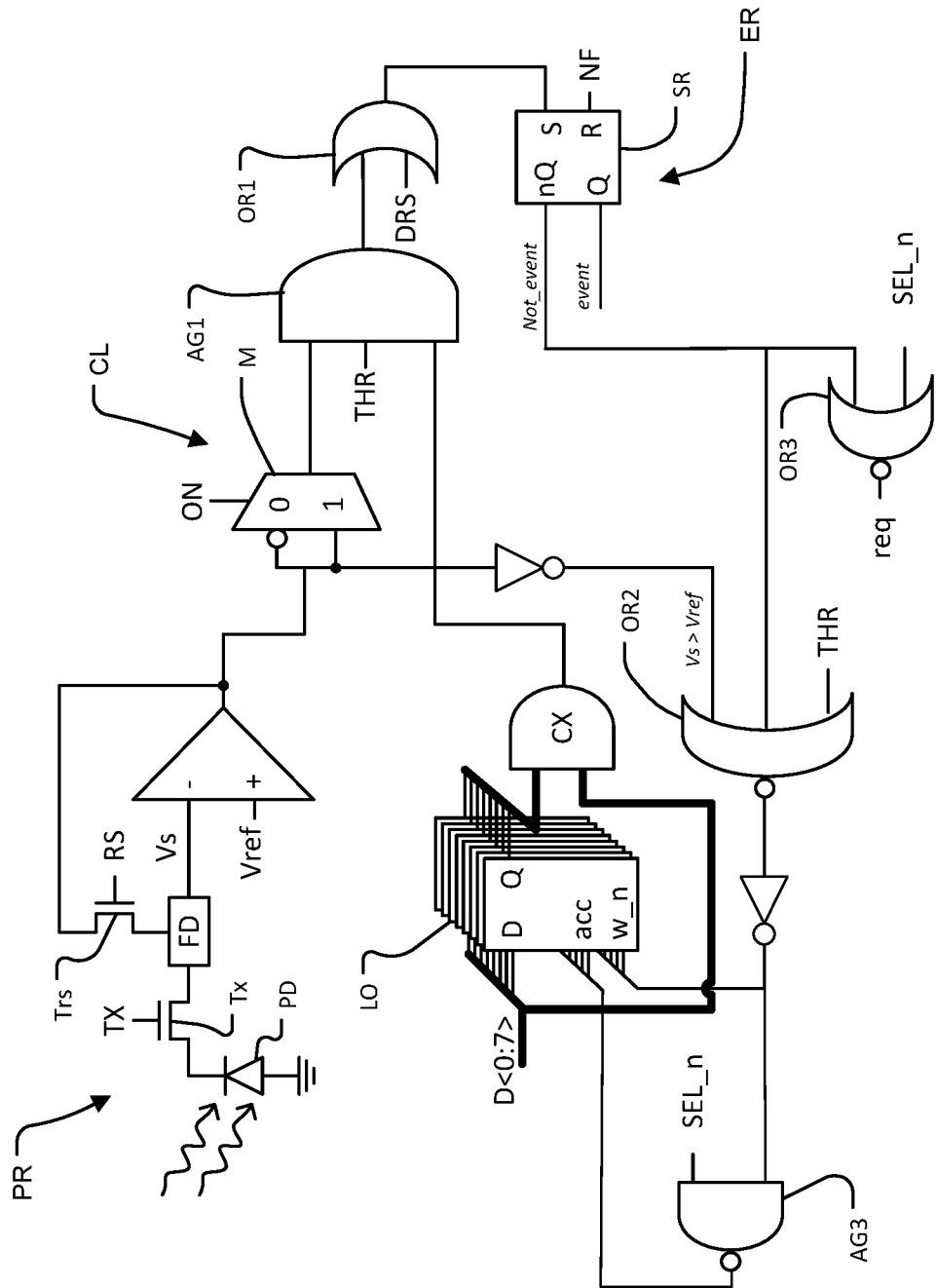
FIG. 8 is a circuit diagram of a digital pixel for an event-based pixel array according to a fourth embodiment.

FIG. 8 is a circuit diagram of the pixels P according to a fourth embodiment.

Here, a third OR gate OR3 receives the not output of the set-reset latch SR along with an active low row select signal SEL_n enabling row-based readout.

The active low row select signal SEL_n also controls the old illumination latch array LO via a third AND gate AG3.

An additional OR gate OR1 is inserted between AND gate AG1 and set-reset latch SR. An input DRS to this OR gate allows forcing an event in each pixel, which forces the sensor to output grayscale values for each pixel.

FIG. 9A is a circuit diagram of one embodiment of the digital comparator CX.

It includes a series of XOR gates ORC that receive the bits of the count A<n> and the bits of the old illumination value A<n> and drive respective PMOS transistors Tc to produce the output OUT.

FIG. 9B is a circuit diagram of another embodiment of the digital comparator CX.

Here are series of NMOS transistor series-connect pairs that receive the bits of the count A<n> and the bits of the old illumination value B<n>, respectively. Each pair are in series between an output node OUT and ground. A PMOS transistor with the gate connected to a bias voltage implements a current source between the power supply and the output node.

Figure 10:
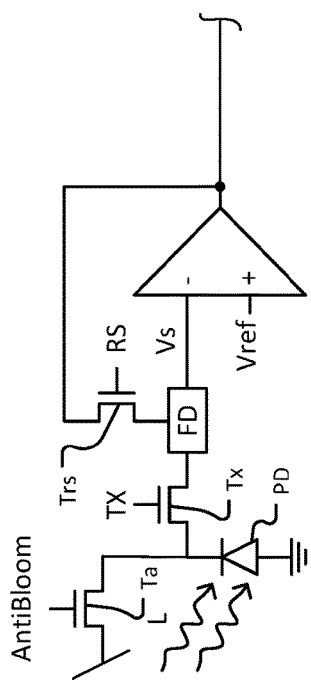
FIG. 10 is a circuit diagram showing an antiblooming front end.

FIG. 10 shows an alternative front end with an antibloom transistor Ta triggered by an antibloom signal to control the sensitivity of the photodiode PD.

Anti-bloom transistor prevents photodiode node going below ground, which would turn on Tx transistor.

Figure 11:
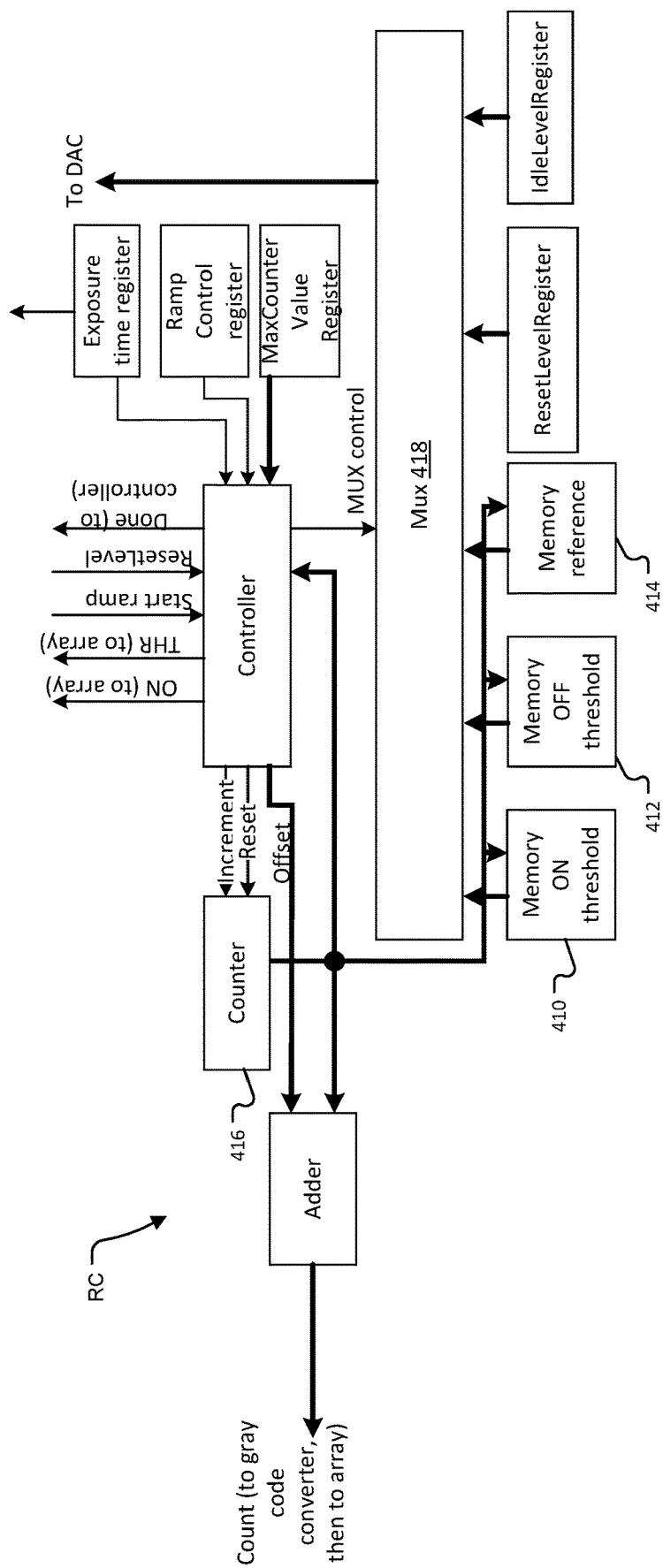
FIG. 11 is a block diagram of the analog ramp Vref and digital ramp generation block.

FIG. 11 is a block diagram of an exemplary the Vref controller/counter RC.

The three ramps are each stored in a three separate memory location as lookup table. Vref with the ThrON offset for the ON detection phase is stored in memory location 410. Vref with the ThrOFF offset for the OFF detection phase is stored in memory location 412. Vnom for the registration phase is stored in memory location 412. The counter circuit 416 serves as memory address. The output of these three memory locations as well as a reset level (is applied to the pixels when signal RS is high) and an idle level (is applied the rest of the time when no ramp and no reset is done) go into the multiplexer 418. The output of the multiplexer is connected to the DAC RG. An offset may be added to the counter value before the counter value is sent to the array.

Figure 12A:
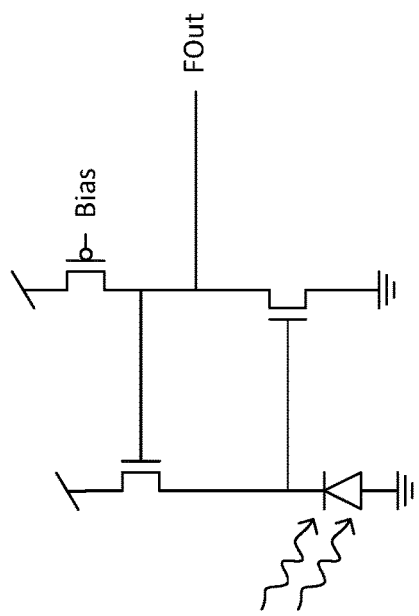
FIGS. 12A, 12B, 12C, and 12D are circuit diagrams showing other possible front ends.
Figure 12B:
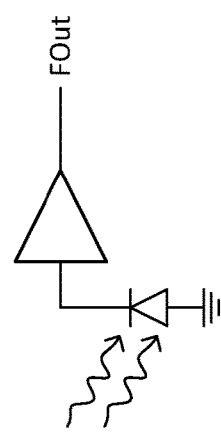

FIGS. 12A and 12B show two alternative front end circuits that could be used in place of the previous examples.

In more detail, FIG. 12A shows a log feedback arrangement with logarithmic illumination to voltage mapping.

In more detail, FIG. 12B shows a photovoltaic arrangement with logarithmic illumination to voltage mapping.

Figure 12C:
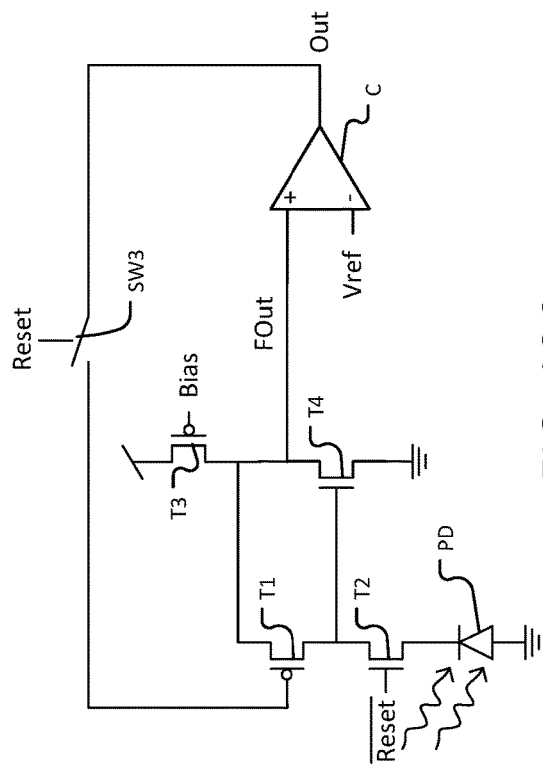
Figure 12D:
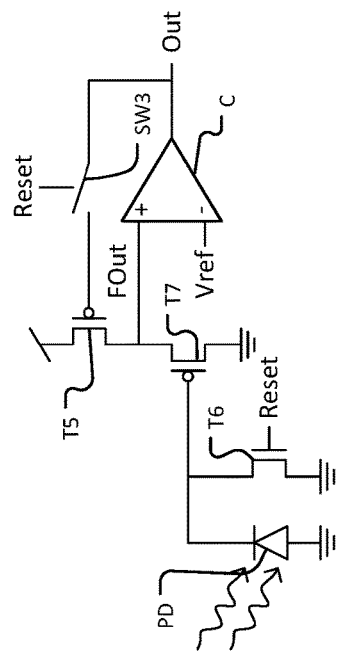

FIGS. 12C and 12D show two further alternative front end circuits that signal to the comparator C.

These frontend circuits will reduce pixel to pixel offsets and generate an acceptable grayscale output even with logarithmic front-end. Moreover, a double-sampling scheme may be used. And, both examples allow a differential double sampling so that the resulting gray scale value should have small offset. In more detail, FIG. 12C shows a log feedback arrangement wherein the output of the comparator C is feedback through a switch SW3 controlled by the Reset signal. The feedback is received in an amplifier arrangement producing FOut to the comparator C. The amplifier comprises transistors T1, T2, T3, T4, where transistor T2 is also controlled by the inverted Reset signal and transistor T3 is controlled by a bias voltage signal.

In more detail, FIG. 12D shows a photovoltaic feedback arrangement wherein the output of the comparator C is feedback through switch SW3 controlled by the Reset signal. The feedback is received in an amplifier arrangement producing FOut to the comparator C. The amplifier comprises transistors T5, and T7. Transistor T6 is also controlled by the Reset signal.

As shown, the frontend may also be implemented using logarithmic frontends which results in an increased noise due to the absence of double sampling schemes, mismatch and continuous time operation. If a front-end with logarithmic light to voltage mapping is used, then Vref ramp and counter output should be both linear.

Figure 13:
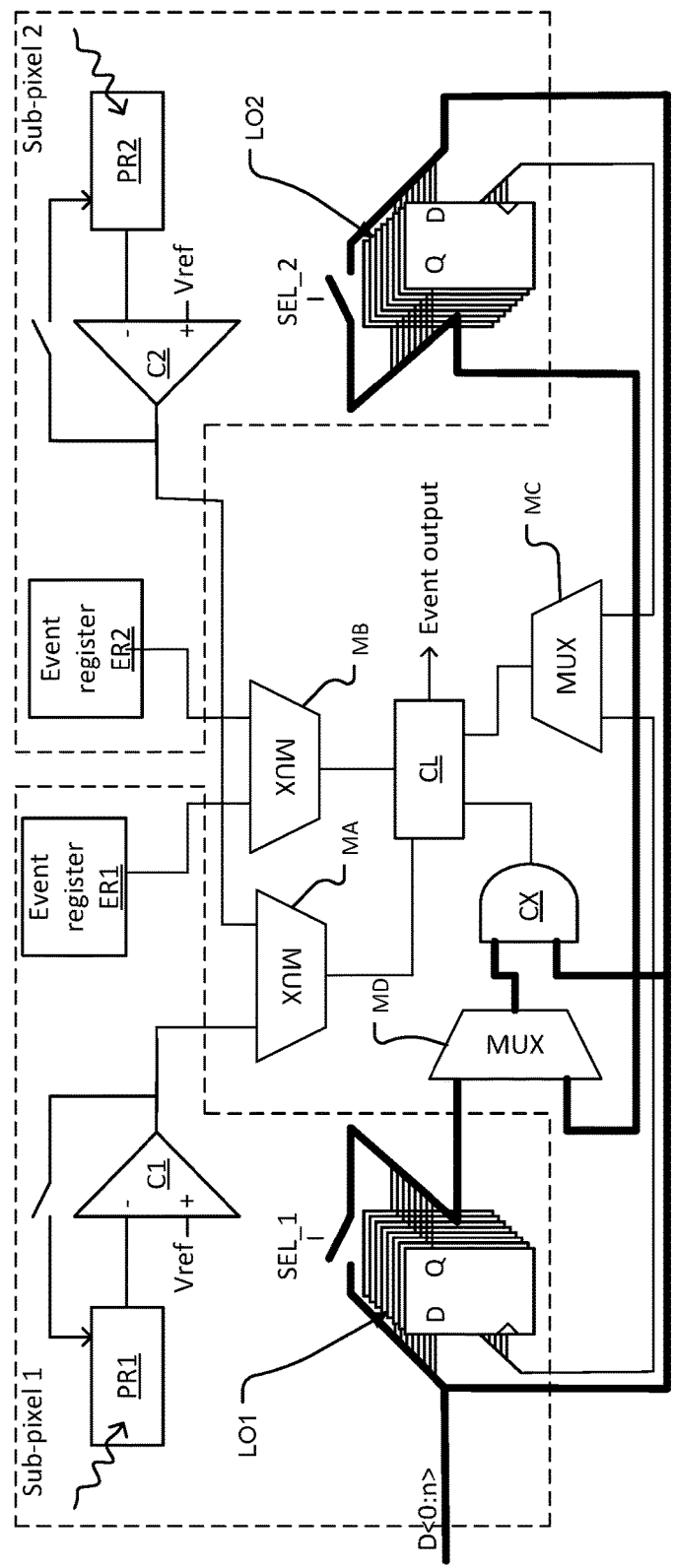
FIG. 13 is a schematic block diagram showing another embodiment that uses sub-pixels so that the digital comparator CX and control logic CL are shared between these subpixels.

FIG. 13 shows the lay-out of an event-based vision sensor EB VS employing multiple voltage ramps for ON event, OFF event, and grayscale detection that uses a subpixel scheme.

In more detail, four multiplexors MA, MB, MC, MD are added. This enables the digital comparator and the control logic to be shared between adjacent pixels. As a result, separate results are stored to a respective event register ER1, ER2 for the respective subpixel 1 and subpixel 2. This figure shows an embodiment in which two (2) subpixels share one digital comparator and one control logic, but other embodiments in which more subpixels share the comparator and control logic are also possible.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical sensor, wherein each pixel comprises:
a photoreceptor for detecting received light;
an analog comparator for comparing signal from the photoreceptor to voltage ramps;
a memory for storing a previous illumination value;
a digital comparator for comparing a current count to the previous illumination value; and
control logic for determining whether event has occurred based on the digital comparator and the analog comparator.

2. The sensor of claim 1, wherein the control logic determines whether an ON event or OFF event occurred.

3. The sensor of claim 1, wherein the photoreceptor and at least part of the analog comparator are implemented in a different wafer from the memory and the digital comparator.

4. The sensor of claim 1, wherein the analog comparator compares the signal from the photoreceptor to a registration ramp and the control logic stores the count as a new illumination value in the memory based on the comparison by the analog comparator.

5. The sensor of claim 1, further comprising a controller and counter that generates an ON event ramp for determining ON events, an OFF event ramp for determining OFF events, and a registration ramp for determining a current illumination of the photoreceptor.

6. The sensor of claim 1, wherein the output of the digital comparator determines when the output of the analog comparator is analyzed to determine if an event has occurred.

7. The sensor of claim 1, wherein the digital comparator is shared with another pixel.

8. The sensor of claim 1, wherein ramp voltage varies exponentially over time.

9. An optical sensing method, comprising:
generating a digital comparison of a count and a previous illumination value;
generating an analog comparison between a signal from a photoreceptor and voltage ramps; and
determining whether an event has occurred based on the digital comparison and the analog comparison.

10. The method of claim 9, further comprising determining whether an ON event or OFF event occurred based on the digital comparison and the analog comparison.

11. The method of claim 9, wherein photoreceptor and at least part of an analog comparator are implemented in a different wafer from a memory and a digital comparator.

12. The method of claim 9, further comprising performing an analog comparison between the signal from the photoreceptor and a registration ramp and storing a new illumination value based on the analog comparison.

13. The method of claim 9, further comprising generating an ON event ramp for determining ON events, an OFF event ramp for determining OFF events, and a registration ramp for determining a current illumination of the photoreceptor.

14. The method of claim 9, further comprising sharing a digital comparator between pixels.

15. The method of claim 9, wherein ramp voltages vary exponentially over time.

16. The method of claim 9, wherein determining whether an event has occurred based on the digital comparison and the analog comparison comprises checking an output of an analog comparator producing the analog comparison at a time when the digital comparison performed by a digital comparator is based on a count and content of a memory.

* * * * *